Patented Sept. 18, 1951

2,567,979

UNITED STATES PATENT OFFICE 2,567,979

DENTAL IMPRESSION COMPOSITIONS

Philander B. Taylor, Larchmont, N. Y., assignor to Cosmos Dental Products, Inc., New York, N. Y., a corporation of New York No Drawing. Application August 5, 1947, Serial No. 766,479

6 Claims. (Cl. 260—31.2)

The present invention relates to compositions of matter suitable for the making of dental impressions of the oral tissue. More particularly it relates to novel compositions of matter which may be prepared by mixing a resin of the ethylene derivative type in powder form and a liquid, to produce a material of suitable consistency which may be placed in a dental impression tray and held in contact with the tissues of the mouth until the composition has "set" to an elastomeric condition.

Most materials heretofore used for making dental impressions have been hydrocolloids containing considerable water up to as much as 90%, in consequence of which dimensional variations incidental to the evaporation of the water commenced immediately after taking the impression. The hydro colloids employed have been agar-agar and alginates. The agar-agar materials have the additional disadvantage that they must be heated and then cooled below their gelation temperature in the mouth. Moreover, in the taking of the impression, voids due to bubbles are frequently encountered which can not be patched by the addition of a fresh mix to the impression and reinsertion in the mouth.

The objects of the present invention are (1) to provide a dental impression material which will shrink much less and much less rapidly than the prior art materials; (2) to provide a dental impression material of a viscous nature which may be prepared to various viscosities without the use of elevated temperature; (3) to provide such material which will permit of its use either in cases where it is desired to obtain an impression of the soft tissue of the mouth or where it is desired to compress the soft tissue; (4) to provide such material which will be capable of use in correcting defective impressions; and (5) to provide such material which will set to an elastomeric condition within a practical dental working time range.

The foregoing and other objects of my invention not specifically enumerated I accomplish by the novel compositions hereinafter described.

In my co-pending application Serial No. 766,478 filed August 5, 1947, I have described a method and means of accelerating the time required for obtaining an elastomeric condition in various plastic molding compositions without resorting to the use of elevated temperature. In said application I have described the addition to the plasticizer of a modifying agent which functions to promote and accelerate the incorporation of the plasticizer into a mass of unplasticized or partially plasticized resin and thereby reduce the time required for the resin to reach the elastomeric condition. In applying the inventive concept disclosed in said application to the formulation of dental impression materials, certain difficulties were encountered due to the irritating effect on the mucous membranes of the mouth by most of the plasticizer organic liquid modifying agents disclosed, where a reasonable setting time of the impression material was to be achieved. One of the plasticizer organic liquid modifying agents which may be employed in fairly significant amounts, since it is reasonably tolerated by the tissues, at least for the limited time necessary to secure a dental impression, is carbon tetrachloride. This organic liquid modifying agent alone, however, does not sufficiently accelerate the setting of the impression material, so that it is necessary to employ a relatively small amount of a more active accelerating agent such as acetone, ethyl acetate, chloroform, etc. to bring the setting time within a practical dental working range.

A variety of ethylene derivative type resins, i. e., resins having at least one ethylene linkage $>C=C<$ for example: the vinyls, mixtures of vinyls with acrylates, methacrylates and copolymers thereof, have been found suitable for mixing with the liquid to prepare the desired dental impression material.

I have discovered that a smooth mix of resin and the liquid (plasticizer and organic liquid modifying agents for such plasticizer) may be more readily attained and that the amount of very active accelerating agent necessary may be materially reduced by dissolving a small amount, usually a few per cent. of a resin in the liquid which is subsequently to be employed in mixture with a resin of the ethylene derivative type to provide the impression material. The resin which is dissolved in the liquid need not necessarily be the same resin which is used in making the impression material.

According to my invention the resin and the liquid which are to be mixed to provide the dental impression material, are preferably separately packaged in units, and when it is desired to make a dental impression, the resin portion and the liquid portion of a unit are thoroughly mixed together with a spatula or the like, placed in an impression tray, and the desired impression is then taken by any well known technique. Examples of various compositions for the liquid portion of the unit which have been found satisfactory are set forth in the following table, said compositions being on the basis of 100 cc. to which has also been added a small amount of flavoring and the small amount of a dissolved resin as above set forth:

|  | A | B | C | D | E | F |
|---|---|---|---|---|---|---|
| Acetone cc | 7.0 | 7.0 | 7.0 | 7.0 | 7.0 | 1.0 |
| Carbon Tetrachloride cc | 33.0 | 63.0 | 53.0 | 18.0 | 73.0 | 39.0 |
| Dibutyl Phthalate cc | 60.0 | 30.0 | 40.0 | 75.0 | 20.0 | 60.0 |
| Lemon Flavoring cc | 0.4 | 0.4 | 0.4 | 0.4 | 0.4 | 0.4 |
| Copolymer: | | | | | | |
| 90% vinyl chloride grams | 5 | 5 | 5 | 5 | 2.5 | 5 |
| 10% vinyl acetate grams | | | | | | |

In preparing the dental impression material, approximately 10 cc. of any of the above compositions is thoroughly mixed by spatulation with approximately 6 grams of a 90% vinyl chloride–10% vinyl acetate copolymer in powdered form, allowing about one minute for mixing, one minute for placing in the impression tray and getting the tray into the mouth and about two minutes more for the impression material to reach an elastomeric condition in the mounth. Compositions A, C and D gave satisfactory results in the allotted four minute period for taking the impressions. Composition B was found to set in less than one minute, while composition E required about seven minutes to set. It was also found that the impression materials when prepared as above set forth gave best results at working temperatures below 70° F. Good results were also obtained at low room temperatures where the powder resin portion of the unit consisted entirely of an 86% vinyl chloride–14% vinyl acetate copolymer.

I have also found that if 5–30% of a filler material is added to the resin portion of the unit that the working temperature range of the impression material can be raised to body temperature. Filler materials which I have found to be satisfactory are magnesium oxide, calcium sulphate, silica, talc, etc., and resins of the ethylene derivative type heretofore specified but which are more slowly acted upon by the liquid than the powdered resin employed by the impression composition. Particularly good results were obtained when the powder resin of the unit as above set forth contained between 5–30% of a filler consisting of 95% vinyl chloride and 5% vinyl acetate.

Although in the preceding table there are set forth various percentages of acetone, carbontetrachloride and dibutyl phthalate for the liquid portion of the unit, I have determined that the working range percentages of said substances may be as follows: acetone—1% to 15%, carbontetrachloride—1% to 80% and dibutyl phthalate—5% to 80%. In this connection it is to be noted that as the liquid composition is varied within wide limits, the amount of the resin initially dissolved therein must be varied. For example, compare the amount of copolymer in composition E with the other compositions set forth in the table with particular reference to the percentage of carbontetrachloride. In fact, using carbontetrachloride alone, 2 grams of copolymer dissolved in the liquid was found to be sufficient. The liquid may contain up to 10% of resin in solution.

Although I have disclosed various liquid and powder compositions to be mixed to provide dental impression materials, it is to be understood that the disclosure herein is not intended to be limitative of the scope of the invention, but merely illustrative thereof. Also plasticizers and modifying agents other than those specifically set forth herein or combinations thereof with or without the addition of resin to the liquid portion may be employed to produce satisfactory impression materials of the type set forth.

What I claim is:

1. A dental impression material formed by thoroughly mixing together at room temperature, at the time of need for said material, a powdered vinyl chloride-vinyl acetate copolymer containing between 86% and 95% vinyl chloride and 14% to 5% vinyl acetate and a plasticizing liquid containing between 20% and 60% of dibutyl phthalate and 80% to 40% of an organic liquid modifying agent capable of promoting the action of the plasticizer on the copolymer to cause said resultant material to attain an elastomeric state within a practicable working time range, said modifying agent comprising carbon tetrachloride and at least one of the solvents selected from the group consisting of acetone, ethyl acetate and chloroform, the copolymer and the plasticizing liquid being used in the ratio of approximately 6 grams of copolymer to 10 cc. of liquid.

2. A dental impression material according to claim 1 wherein the modifying agent consists of from 1% to 15% acetone and a substantial amount of up to 80% carbon tetrachloride, said percentages being of the total liquid employed for mixing with the powder.

3. A dental impression material formed by thoroughly mixing together, at room temperature, at the time of need for said material, a powdered vinyl chloride-vinyl acetate copolymer containing between 86% and 95% vinyl chloride and 14% to 5% vinyl acetate and a liquid plasticizing composition consisting of 20% to 60% dibutyl phthalate and 80% to 40% of a solvent capable of promoting the action of the dibutyl phthalate on the copolymer to transform the powdered copolymer to an elastomeric condition within a practicable working time range of from 2 to 7 minutes, the solvent for the plasticizer comprising carbon tetrachloride and one of the substances selected from the group consisting of acetone, ethyl acetate and chloroform, the liquid plasticizing composition containing in solution up to 10% of the total amount of the copolymer to be plasticized by the liquid to enable said liquid to provide a smooth mix with the powdered copolymer employed for the impression composition when said liquid and said powdered copolymer are mixed together, the copolymer and the liquid being used in the ratio of approximately 6 grams of copolymer to 10 cc. of liquid.

4. A dental impression material formed by thoroughly mixing together, at room temperature, at the time of need for said material, a powdered vinyl chloride-vinyl acetate copolymer containing approximately 90% vinyl chloride and approximately 10% vinyl acetate, and a liquid plasticizing composition capable of causing the copolymer to attain an elastomeric state in from 2 to 7 minutes, the coplymer and the liquid being used in the ratio of approximately 6 grams of copolymer to 10 cc. of liquid, said 10 cc. of liquid plasticizing composition containing the following substances in approximately the percentages by volume, viz: acetone 7%, carbon tetrachloride 33%, dibutyl phthalate 60%, and ½ gram of the aforementioned copolymer dissolved in said liquid.

5. A dental impression material according to claim 4 wherein the copolymer contains from 5% to 30% by weight of a filler consisting of 95% vinyl chloride–5% vinyl acetate copolymer.

6. A liquid composition for use in plasticizing, at room temperature and at atmospheric pressure, a powdered vinyl chloride-vinyl acetate copolymer containing between 86% and 95% vinyl chloride and 14% to 5% vinyl acetate, said liquid composition containing dibutyl phthalate as the plasticizer for the copolymer and an organic liquid modifying agent for said dibutyl phthalate comprising carbon tetrachloride, and at least one of the solvents selected from the group consisting of acetone, ethyl acetate and chloroform, and said liquid containing, in solution, a useful quantity up to 10% of the total amount of the copolymer to be plasticized by said liquid.

PHILANDER B. TAYLOR.

REFERENCES CITED

The following references are of record in the file of this patent:

UNITED STATES PATENTS

| Number | Name | Date |
|---|---|---|
| 2,205,488 | Merrick | June 25, 1940 |
| 2,296,877 | Slack | Sept. 29, 1942 |
| 2,354,744 | Dreyfus | Aug. 1, 1944 |
| 2,367,767 | Gale | Jan. 23, 1945 |
| 2,385,920 | Jenkins | Oct. 2, 1945 |